United States Patent
Sun et al.

(10) Patent No.: US 12,180,380 B2
(45) Date of Patent: Dec. 31, 2024

(54) HIGHLY CONDUCTIVE, PRINTABLE INK FOR HIGHLY STRETCHABLE SOFT ELECTRONICS AND HIGHLY CONDUCTIVE, ULTRA-STRETCHABLE CONDUCTORS OBTAINABLE THEREFROM

(71) Applicant: KARLSRUHER INSTITUT FÜR TECHNOLOGIE, Karlsruhe (DE)

(72) Inventors: Hongye Sun, Karlsruhe (DE); Norbert Willenbacher, Kirchheimbolanden (DE)

(73) Assignee: KARLSRUHER INSTITUT FÜR TECHNOLOGIE (DE)

( * ) Notice: Subject to any disclaimer, the term of this patent is extended or adjusted under 35 U.S.C. 154(b) by 642 days.

(21) Appl. No.: 17/431,510

(22) PCT Filed: Feb. 14, 2020

(86) PCT No.: PCT/EP2020/053886
§ 371 (c)(1),
(2) Date: Aug. 17, 2021

(87) PCT Pub. No.: WO2020/182408
PCT Pub. Date: Sep. 17, 2020

(65) Prior Publication Data
US 2022/0049119 A1 Feb. 17, 2022

(30) Foreign Application Priority Data

Mar. 11, 2019 (EP) .................................... 19161884

(51) Int. Cl.
*C09D 11/00* (2014.01)
*C09D 11/033* (2014.01)
*C09D 11/037* (2014.01)
*C09D 11/102* (2014.01)
*C09D 11/52* (2014.01)

(52) U.S. Cl.
CPC ............ *C09D 11/52* (2013.01); *C09D 11/033* (2013.01); *C09D 11/037* (2013.01); *C09D 11/102* (2013.01)

(58) Field of Classification Search
CPC ..... C09D 11/52; C09D 11/033; C09D 11/037; C09D 11/102
USPC .......................................... 106/31.01, 31.13
See application file for complete search history.

(56) References Cited

FOREIGN PATENT DOCUMENTS

| EP | 3267491 | 1/2018 |
| KR | 101233982 | 2/2013 |
| WO | 2016145309 | 9/2016 |
| WO | WO-2016145309 A1 * | 9/2016 |

OTHER PUBLICATIONS

Sun et al.; Conductive Enhancement of Thermal Interface Material via Capillary Attraction; 2016 IEEE 66th Electronic Components and Technology Conference; pp. 1409-1414.*
Sun et al. (Conductive Enhancement of Thermal Interface Material via Capillary Attraction; 2016 IEEE 66th Elctronic Components and Technology Conference; pp. 1409-1414). (Year: 2016).*

(Continued)

*Primary Examiner* — James E McDonough
(74) *Attorney, Agent, or Firm* — McDonald Hopkins LLC

(57) ABSTRACT

The present invention relates to highly conductive, printable inks for highly stretchable soft electronics, a process for their manufacture as well as highly conductive, ultra-stretchable conductors obtainable therefrom.

15 Claims, 5 Drawing Sheets

(56) References Cited

OTHER PUBLICATIONS

Sun et al., "Conductivity Enhancement of Thermal Interface Material via Capillary Attraction,"The Hong Kong University of Science and Technology, May 31, 2016, pp. 1409-1414, XP032947720, Hong Kong, China.
Patent Cooperation Treaty (PCT), International Search Report and Written Opinion for Application PCT/EP2020/053886 filed Feb. 14, 2020 mailed May 18, 2020, International Searching Authority, EP.
Guo et al., "3D Printed Stretchable Tactile Sensors," Advanced Materials, 2017, 29, Minnesota, United States.
Kim et al., "A photonic sintering derived Ag flake/nanoparticle-based highly sensitive stretchable strain sensor for human motion monitoring," Nanoscale, 2018. vol. 10, pp. 7890-7897.
Koos et al., "Capillary Forces in Suspension Rheology," Science, 2011, vol. 331, pp. 897-900.
Koos et al., "Particle configurations and gelation in capillary suspensions," Soft Matter, 2012, vol. 8, pp. 3988-3994.
Larmagnac et al., "Stretchable electronics based on Ag-PDMS composites," Scientific Reports, 2014, vol. 4, Switzerland.
Matsuhisa et al., "Printable elastic conductors by in situ formation of silber nanoparticles from silver flakes," Nature Materials, 2017. vol. 16, pp. 834-841. Japan.
Valentine et al., "Hybrid 3D Printing of Soft Electronics," Advanced Materials, 2017. vol. 29. United States.
Wang et al., "Printalbe superelastic conductors with extreme stretchability and robust cyclying endurance enabled by liquid-metal particles," Advanced Materials, 2018. vol 30. Singapore.

\* cited by examiner a b

HIGHLY CONDUCTIVE, PRINTABLE INK FOR HIGHLY STRETCHABLE SOFT ELECTRONICS AND HIGHLY CONDUCTIVE, ULTRA-STRETCHABLE CONDUCTORS OBTAINABLE THEREFROM

CROSS-REFERENCE TO RELATED APPLICATION

This application is a 35 U.S.C. 371 national stage filing of PCT Application No. PCT/EP2020/053886 filed on Feb. 14, 2020, entitled "HIGHLY CONDUCTIVE, PRINTABLE INK FOR HIGHLY STRETCHABLE SOFT ELECTRONICS AND HIGHLY CONDUCTIVE, ULTRA-STRETCHABLE CONDUCTORS OBTAINABLE THEREFROM," which claims priority to European Patent Application No. 19161884.2, filed on Mar. 11, 2019, each of which are incorporated herein in their entirety by reference.

The present invention relates to highly conductive, printable inks for highly stretchable soft electronics, a process for their manufacture as well as highly conductive, ultra-stretchable conductors obtainable therefrom.

The development of soft electronics with unique flexibility, conformability, and stretchability opens up new frontiers in personalized healthcare, consumer electronics, and soft robotics. Particularly, wearable sensors to collect real-time sensing data on human behaviors are in high demand. Flexible conductive wiring and printed circuits are urgently required to integrate components for flexible electronic devices. Emerging 3D printing technologies provide a platform for rapidly prototyping and customizing electronics for individuals. The development of conductive and printable inks for fabricating elastomeric conductors with both high conductivity and stretchability is therefore essential.

Conductive particle-filled elastomers are the most commonly used inks for printed stretchable electronics because they are easily adapted to various printing technologies and formulations can be customized to meet electro-mechanical and economic specifications. Overcoming the trade-off between high electrical conductivity and high stretchability in the current conductive elastomers, however, is a major challenge. While increasing the volume fraction (vol. %) of conductive solids guarantees high conductivity, it deteriorates the stretchability. This dilemma severely limits the use of polymer-based conductive inks in soft electronics. Recent research focused on the use of liquid metal such as eutectic gallium-indium (EGaln) (Wang, J., et al., Printable Superelastic Conductors with Extreme Stretchability and Robust Cycling Endurance Enabled by Liquid-Metal Particles. Advanced Materials, 2018. 30(16): p. 1706157) or nanoparticles (Matsuhisa, N., et al., Printable elastic conductors by in situ formation of silver nanoparticles from silver flakes. Nature materials, 2017. 16(8): p. 834) as electrical interconnections between large conductive particles to simultaneously achieve high conductivity, stretchability, and printability. Despite their costly ingredients and complex fabrication processes, such as delicate temperature and process control, these materials are promising candidates for wiring and electrodes due to the robustness of the anchors (EGaln or nanoparticle), but they are not suitable for sensing applications due to small changes in their conductivity when strain is applied.

Thus, the technical objective underlying the present invention is to provide a simple and economic way to produce a highly conductive and printable ink providing high deformability and stretchability in the corresponding printed device for application in soft electronics. The ink fabrication should be compatible with state of the art unit operations and should allow for large scale production.

This objective and others which will become apparent from the following disclosure, are achieved by the present invention which makes use of the capillary suspension phenomenon to design highly conductive and printable inks providing high deformability and stretchability in the corresponding printed devices for applications in soft electronics.

In particular, the present invention relates to a highly conductive, printable ink, comprising a conductive solid phase and two immiscible fluid phases as defined in claim 1 and highly conductive, ultra-stretchable conductors obtainable therefrom as defined in claim 13.

In particular, there is provided a highly conductive, printable ink, comprising:
(i) 1.5 to 21.0 vol % of conductive hydrophobic silver particles, with respect to the total volume of ink, as conductive solid phase,
(ii) a liquid primary phase comprising, as a polymer base, a thermoplastic polyurethane (TPU) dissolved in an organic polar solvent, wherein the volume content of TPU in the organic polar solvent is in the range of 25% to 50%, wherein the liquid primary phase takes up 76.90 to 98.49 vol % with respect to the total volume of ink,
(iii) a liquid secondary phase based on an ionic liquid, with a volume content in the range of 0.0015 to 2.1 vol % with respect to the total volume of ink, while the volume ratio $\rho$ between said liquid secondary phase and said conductive solid phase falls in the range of 0.001 to 0.1, wherein the liquid secondary phase is immiscible with the liquid primary phase and does not wet the conductive solid phase, so that the three-phase system creates a capillary suspension.

Moreover, there is provided a process for producing such a highly conductive, printable ink according to the present invention, comprising:
mixing of
(i) 1.5 to 21 vol % of conductive hydrophobic silver particles, with respect to the total volume of ink, as conductive solid phase,
(ii) a liquid primary phase comprising, as a polymer base, a thermoplastic polyurethane (TPU) dissolved in an organic polar solvent, wherein the volume content of TPU in the organic polar solvent is in the range of 25% to 50%, wherein the liquid primary phase takes up 76.90 to 98.49 vol % with respect to the total volume of ink,
(iii) a liquid secondary phase based on an ionic liquid, with a volume content in the range of 0.0015 to 2.1 vol % with respect to the total volume of ink, while the volume ratio $\rho$ between said liquid secondary phase and said conductive solid phase falls in the range of 0.001 to 0.1, wherein the liquid secondary phase is immiscible with the liquid primary phase and does not wet the conductive solid phase, so that the three-phase system creates a capillary suspension.

Furthermore, there is provided a highly conductive, ultra-stretchable conductor obtainable from such ink according to the present invention, comprising:
(i) 5 to 30 vol %, preferably 8 to 20 vol %, of conductive hydrophobic silver particles, with respect to the resulting solid conductor, as conductive solid phase,
(ii) 67 to 94.99 vol %, preferably 78.80 to 91.99 vol %, of thermoplastic polyurethane (TPU), and (iii) a liquid (secondary) phase based on an ionic liquid, with a volume fraction of 0.005 to 3.0 vol %, preferably 0.08 to 1.20 vol %, with respect to the resulting solid conductor, while the volume ratio ρ between said liquid secondary phase and said conductive solid phase falls in the range of 0.001 to 0.1.

The present invention adopts a simple and versatile framework for fabricating highly conductive and stretchable elastomers. The physical mechanism behind is self-assembly of the suspended conductive particles induced by the addition of a small amount of a second fluid immiscible with the bulk fluid of the suspension, i.e., the polymer matrix, and the resulting capillary forces in such a ternary solid/fluid/fluid system; cf. Koos, E. and N. Willenbacher, Capillary forces in suspension rheology. Science, 2011. 331(6019): p. 897-900. This yields a low percolation threshold and high conductivity is achieved with low consumption of the solid conductive silver particles, enabling high stretchability without compromising conductivity. The only constraints on the choice of the secondary fluid besides its immiscibility with the bulk phase are that the three-phase contact angle δ of that fluid on the particles within the bulk phase must be smaller than 150°, typically being in the range from 90° to 150°, thus creating a capillary state capillary suspension (cf. Koos Erin and Norbert Willenbacher. Soft Matter 8.14 (2012): 3988-3994). The exact upper contact angle limit depends on the cluster structure and bridge volume, i.e. for some systems the maximum contact angle may be lower than the theoretical limit stated above. It should be noted that the three phase contact angle δ is a material property depending on two liquids as well as the solid phase of the ternary system. Particularly, the three phase contact angle is determined by the sessile drop method in accordance with ASTM Standard D7334. Ag particles are pressed into a condensed pellet and immersed in the primary polymer phase. A secondary fluid droplet is squeezed out from a syringe loaded above and settles down on the Ag pellet. The typical droplet size used in contact angle measurements is between 1 and 10 microliters. Droplet shape is recorded by a camera and the three phase contact angle is determined by droplet profile fitting. The type and amount of secondary fluid control the morphology of the conductive particle network and printability (elastic modulus and yield stress) of the paste.

The ink according to the present invention can be printed into sensors as well as conductive wirings with a good combination of electrical conductivity and stretchability. The initial electrical conductivity ($EC_0$) of the elastomer conductors reaches ~$10^3$ S/cm and the strain ε can be applied beyond 1600% without any mechanical failure. Upon stretching, samples can be repeatedly switched between conductive and non-conductive without any retardation. Regarding practical applications, for example, strain sensors and conductive wirings can be fabricated from Ag-TPU inks according to the present invention using a 3D printer.

Bulk Phase

Bulk phase of the inks according to the present invention, i.e. primary liquid phase, is the solution of thermoplastic polyurethane (TPU), obtained by dissolving TPU in organic polar solvents. Typically, the volume content of TPU in the organic polar solvent is in the range of 25% to 50%, preferably 30% to 40%. Shear mixer can be employed to shorten the dissolution time. Viscosity of the final solution depends very much on the TPU selected and mix of solvents used. The polar solvents of the primary liquid phase can be selected from tetrahydrofuran (THF), dimethyl formamide (DMF), dimethyl sulfoxide (DMSO), dimethylacetamide (DMAc) or their combinations. Acetone, methyl ethyl ketone (MEK), cyclohexanone, toluene or ethyl acetate (ETAc) can also be added as co-solvent to improve the solubility of TPU.

Either polyester-based or polyether based TPU with high elongational failure strain (also called elongation at break) $ε_r$, ranging from 50% to 2500%, preferentially 100% to 2000%, can be used. Elongational failure strain (also called elongation at break) $ε_r$ can be determined in accordance with DIN 53504-S2.

Solid Conductive Phase

Hydrophobic silver (Ag) particles, 1.5 to 21 vol %, with respect to the total volume of ink, are dispersed in the TPU solution, i.e. hydrophobic silver (Ag) particles, 5 to 30 vol %, preferably 8 to 20 vol %, with respect to the final solid conductor, are dispersed in the TPU solution. The hydrophobicity of the selected Ag particles, usually Ag flakes, promises good compatibility with the hydrophobic TPU elastomer, which is crucial for good durability of the printed conductors.

Preferably, the conductive silver particles have a medium particle size d50 of 0.1 to 50 μm, determined by laser diffraction (in accordance with DIN EN 725-5, ISO 13320).

Hydrophobic silver particles are added to guarantee a good dispersibility as well as good compatibility with the hydrophobic matrix, which is a key to achieve high stretchability and good cyclic stability, because poor compatibility would cause microscopic ruptures between silver flakes and the matrix deteriorating ink performance with respect to both mechanical and electrical properties. Hydrophobic silver particles are commercially available.

Secondary Phase

The secondary fluid phase must be immiscible with the primary phase and should not wet the conductive solid phase. The amount of secondary fluid is defined as $p=V_{SF}/V_{Ag}$, where $V_{SF}$ is the volume of secondary fluid and $V_{Ag}$ is the volume of solid Ag particles. According to the invention, secondary fluid phase content p falls in the range of 0.001 to 0.1. The amount of secondary fluid determines the particle network structure and hence the final conductivity.

In the present invention, preferably, an ionic liquid (IL) is used as secondary fluid. This IL may in particular contain a substituted or unsubstituted imidazolium cation, wherein the imidazolium cation of the salt is preferably in the 1- and 3-position or in the 1-, 2- and 3-position with (C1-C6) alkyl groups. More preferably, the imidazolium cation is the 1-ethyl-3-methylimidazolium, 1,3-dimethylimidazolium or 1-butyl-3-methylimidazolium cation. The anion of the ionic liquid is usually a halide, perchlorate, pseudohalide, sulfate, phosphate, alkyl phosphate and/or a C1-C6 carboxylate ion, the halide ion being chloride, bromide and/or iodide ion, the pseudohalide ion being cyanide, thiocyanate and/or cyanate ion and the C1-C6 carboxylate ion being formate, acetate, propionate, butyrate, hexanoate, maleate, fumarate, oxalate, lactate and/or pyruvate. Most preferably, 1-butyl-3-methylimidazolium iodide, 1-butyl-3-methylimidazolium chloride, or 1-butyl-3-methylimidazolium bromide can be used:

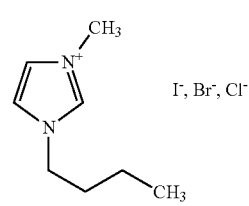

To formulate the ink, silver particles are dispersed in the TPU solution by mechanical stirring. Secondary fluid is added to the silver/TPU suspension. Usually, another mixing step is followed to break up the secondary fluid phase into small droplets which connect silver particles into clusters, which further grow into a sample-spanning conductive network. In particular, the dispersion of the silver particles in the primary solution phase and addition of the secondary phase can be achieved using different state of the art mixing devices such as dissolvers, blenders, ball mills, three roll mills or non-contact planetary mixers. Preferably, a planetary mixer SpeedMixer™ can be used at rotational speeds in the range of 500 to 3000 rpm, preferably 1000 to 2500 rpm, at room temperature. The suspension of silver particles in the primary fluid is preferably achieved employing non-contact planetary mixing in three steps each lasting 5 min with a waiting time of 5 min between subsequent mixing steps. Thus, heating of the sample and unwanted evaporation of solvent can be suppressed. The secondary fluid phase can be added thereto in an additional non-contact planetary mixing step lasting for 1 minute.

The three-phase system creates a capillary suspension, in which the suspended particles self-assemble into a percolating sample-spanning network due to the capillary force induced by the immiscible secondary fluid. The capillary suspension type conductive ink remains stable and no sedimentation occurs within 10 days. Before printing, usually, part of the solvent in the ink is removed to achieve a favorable viscosity range for printing or extrusion. Typically, the preferable viscosity falls in the range of 1 to 100 Pas at a shear rate of $100\ s^{-1}$. Then, it can be printed using standard techniques such as screen printing, slot die coating or spraying or emerging additive manufacturing methods like direct ink writing (DIW). The latter can be used for rapid prototyping complex 3D objects, e.g. pressure or strain sensors. After printing the desired electronic structures, solvents are evaporated completely under vacuum at elevated temperature (<120° C.).

After evaporation, the content of the TPU is typically in the range of 67 to 94.99 vol %, preferably 78.8 to 91.99 vol %, with respect to the resulting elastomer composite, i.e. the highly conductive, ultra-stretchable conductor, with the remainder being the silver particles and a few vol % of the secondary fluid phase. The volume of secondary fluid is typically in the range of 0.005 to 3.0 vol %, preferably 0.08 to 1.2 vol %, with respect to the resulting elastomer composite. The volume ratio ρ between said liquid secondary phase and said conductive solid phase falls in the range of 0.001 to 0.1.

The following tables show the composition volume ratios from ink state (depending on the TPU concentration in the organic polar solvent) and solid conductor state:

TABLE 1

Composition of the resulting conductor at solid state.

| | Resulting solid conductor | | |
|---|---|---|---|
| | Ag vol. % | TPU vol % | Secondary fluid vol. % |
| Composition: | 5–30 | 67–94.99 | 0.005–3 |
| Preference: | 8–20 | 78.8–91.99 | 0.08–1.2 |

TABLE 2

Ink composition at the TPU concentration of 25 vol % in solvents.

| | Ink state | | |
|---|---|---|---|
| | Ag vol. % | Liquid primary phase (25 vol % TPU in solvents) | Secondary fluid vol % |
| Composition: | 1.5–11 | 87.9–98.49 | 0.0015–1.1 |
| Preference: | 2.5–7 | 92.6–97.49 | 0.025–0.42 |

TABLE 3

Ink composition at the TPU concentration of 50 vol % in solvents.

| | Ink state | | |
|---|---|---|---|
| | Ag vol. % | Liquid primary phase (50 vol % TPU in solvents) | Secondary fluid vol % |
| Composition: | 3.0–21 | 76.9–96.99 | 0.003–2.1 |
| Preference: | 5.0–14 | 85.1–94.99 | 0.05–0.84 |

The dried samples exhibit low percolation threshold and high conductivity at low silver volume fraction. The reduced consumption of silver solids in the flexible polymer guarantees a high, unprecedented stretchability. Besides, it exhibits unprecedented reversibility. Resistance of Ag-TPU recovered completely over many cycles at small strain (e.g. $\varepsilon=20\%$), and repeatedly switched between conductive and non-conductive states at large strains ($\varepsilon=200\%$) without retardation. The resistance changes were always in phase with the applied strain.

Depending on the Ag loading, conductive elastomers are suitable for customizing precise sensors with high Ag loading or robust, flexible wiring with low silver loading. A strain sensor printed with the ink including 10 vol % Ag exhibits a high gauge factor $GF=(\Delta R/R_0)/\varepsilon=7.2$ at 30% cyclic strain showing the high sensitivity to applied deformation, i.e. the high strain sensing accuracy. Conductive wiring obtained from an ink including 15 vol % Ag exhibits a low $\Delta R/R_0$ of ~1.2 at 50% strain demonstrating that resistance barely changes upon deformation.

The inks of the present invention are usable for the following kind of applications:
  (i) Sensors: Biomedical sensors for wearable health monitoring for recording real-time data to reflect the physiological condition of human beings. The inks of the present invention can be used as the candidate of sensing materials.
  (ii) Soft robotics: Artificial skin or E-skin enables the robotics with the ability of sensing the pressure, strain, temperature. Data gloves based on the strain sensing captures the motion of robotic fingers.
  (iii) Wireless devices: Wireless and portable communication devices such as mobile phones are rapidly growing and the antenna in telecommunication systems must be compatible with the soft electronic packaging. The printable and conductive inks of the present invention allow for complex antenna design and radio frequency to propagate.
  (iv) Flexible Solar cell: Flexible thin-film photovoltaic cells are a low cost means to collect solar energy. The inks of the present invention material can provide good contacting of cells on flexible substrates at simultaneously low silver consumption. This is decisive in this future mass market.

(v) Soft electronics: The inks of the present invention can be printed into electric circuits integrated in soft robotics, electronic paper and flexible displays.

The figures show the following:

FIG. 1 are surface SEM images of Ag-TPU elastic conductors without secondary fluid (a) and with secondary fluid (b). The volume fraction of Ag in these samples was 15 vol. %. Secondary fluid (SF) content is defined as $\rho=V_{SF}/V_{Ag}$. The volume ratio $\rho$ between secondary fluid and Ag flakes was $\rho=0.02$.

FIG. 2 shows the dependence of electrical conductivity of Ag-TPU on the amount of secondary fluid. Secondary fluid (SF) content is defined as $\rho=V_{SF}/V_{Ag}$. Highest conductivity is achieved at $\rho=0.02$ for composites with Ag loadings >10 vol %.

FIG. 3 shows the electrical conductivity of a ternary capillary Ag-TPU composite (red symbols) and a binary composite (blue symbols) using the same TPU and silver flakes as a function of silver flake content. For the ternary system, the conductivity is as high as 1300 S/cm at 15 vol % silver content. Dashed lines are a fit of a power-law relationship to the data:

$$\sigma=\sigma_0(\varphi-\varphi_c)^s \text{ with } \varphi>\varphi_c \quad \text{Equation 1}$$

where $\sigma$ is the conductivity of the composites, $\varphi$ is the volume fraction of Ag particles, $\varphi_c$ is the volume fraction of Ag particles at the percolation threshold, s is the critical exponent, and $\sigma_0$ is a prefactor.

The percolation threshold $\phi_c$ is determined to be 6.2 vol % for the ternary capillary system and 19 vol % for the binary system.

FIG. 4 shows stress-strain curves from tensile tests on the dog-bone shaped specimen (S3A, DIN 53504) of Ag-TPU conductors with three different Ag loadings. The maximum strain exceeds 1600% for all silver loading conductors.

FIG. 5 shows electro-mechanical properties of capillary Ag-TPU conductors. a, Dependence of conductivity on the tensile strain for a capillary Ag-TPU with 15 vol. % and a binary system with 38 vol. % silver content. b-c, resistance change of 10 vol. % (b) and 15 vol. % (c) Ag conductors during cyclic tests at a strain of ε=50%. d, resistance increase and recovery during and after a single strain cycle with different maximum strains at a stretch speed of 0.1 mm/s for 15 vol. % Ag-TPU. e-f, Resistance change $R/R_0$ of 15 vol. % Ag-TPU for 8 cycles at a cyclic strain of ε=100% (e) and ε=200% (f). The applied strain is shown in blue.

Figure 8:
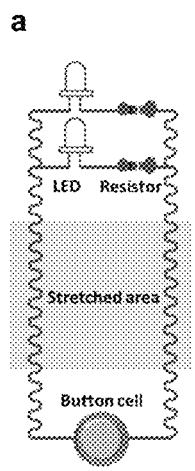
Figure 8:
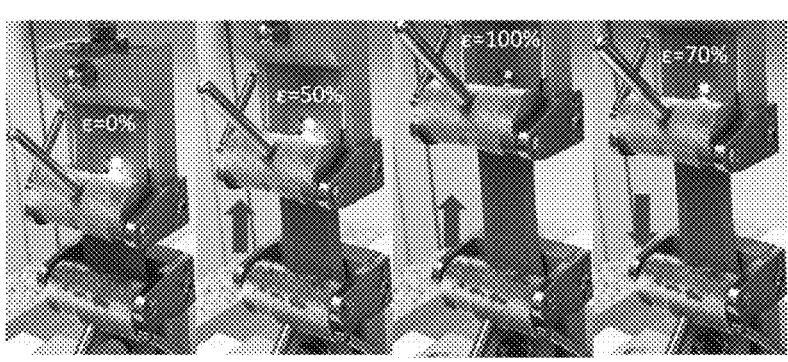

FIG. 8*a* shows a printed stretchable circuit made from 15 vol. % Ag-TPU combined with LEDs, resistors and button cell battery, while FIG. 8*b* shows photographs of the stretched circuit during its stretch to 100% strain. The light turns off at a strain of 100%, but immediately turns on again upon release of strain to 70%.

The invention is described in more detail, but not limited to the following examples.

EXAMPLES

In one example, Ag flakes with an average size of 1 μm (Great Wall Precious Metals Co., China) were taken as conductive particles and thermoplastic polyurethane (TPU) as soft polymer. Thermoplastic polyurethane (TPU) Elastollan 35A (22.5 wt %, BASF SE, Germany) was dissolved in N,N-dimethylformamide (DMF) for 18 h and the solution was further diluted by acetone at a volume ratio of 4:5 between DMF and acetone. Ag flakes were added to the TPU solution by mixing in a planetary mixer at 2000 rpm for 15 min total in 5 min increments, waiting 5 min between subsequent mixing steps. A room-temperature ionic liquid (IL, 1-butyl-3-methylimidazolium iodide, Sigma-Aldrich) as the secondary fluid, was added to the Ag-TPU suspension and mixed using the planetary mixer at 1700 rpm for 1 min.

Figure 1:
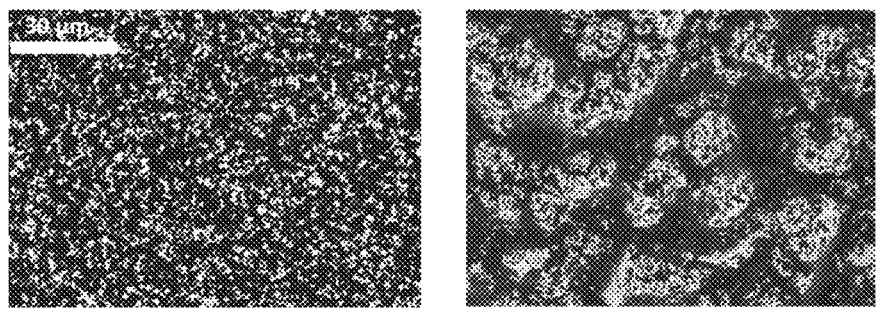
Figure 2:
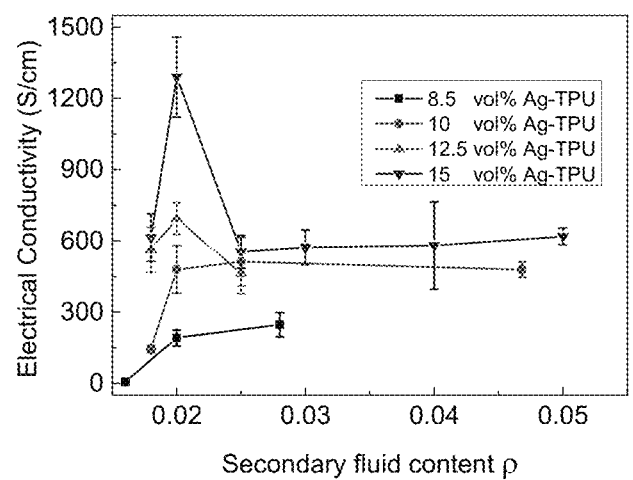
Figure 3:
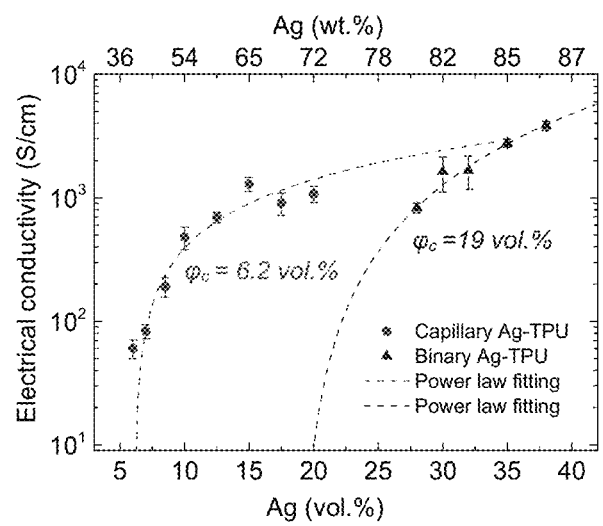
Figure 4:
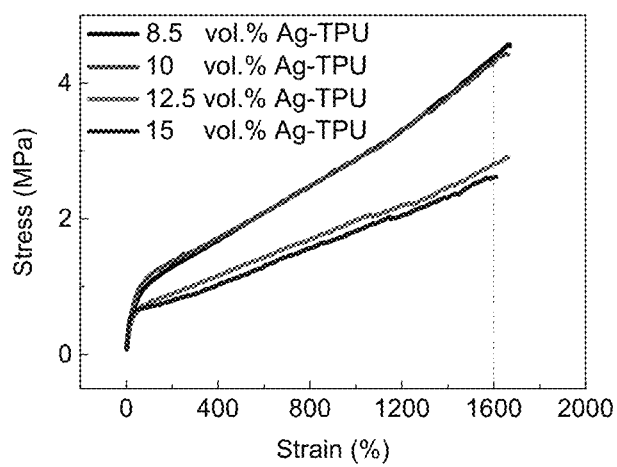

The presence of an Ag-network in the TPU was observed by scanning electron microscopy (SEM) imaging (FIG. 1). The Ag flakes were uniformly distributed in the regular binary mixture (FIG. 1*a*). In contrast, Ag agglomerates were observed in capillary Ag-TPU conductors (FIG. 1*b*). The volume ratio between secondary fluid and Ag flakes was set to 2%. Further increase of secondary fluid would decrease the conductivity, as shown in FIG. 2. The strong capillary force among particles drives self-organization of Ag flakes into a conductive network at a low percolation threshold $\varphi_c$=6.2 vol. %, as shown in FIG. 3. For comparison, the corresponding binary Ag-TPU mixture exhibits $\varphi_c$=19 vol. %, consistent with the (pc values reported earlier using Ag flakes similar in size and shape (Valentine, A. D., et al., *Hybrid 3D printing of soft electronics*, Advanced Materials, 2017, 29(40)). Notably, the initial electrical conductivity (EC) is as high as 1300 S/cm at 15 vol %, while the corresponding conventional ink without capillary bridging is still insulating at this particle concentration. The drastic reduction in $\varphi_c$ and dramatic improvement in EC result from the self-assembly of the Ag particle network induced by capillary forces in the ternary system. According to the low (pc high stretchability of capillary ink-based elastomeric conductors was anticipated. Respective stress-strain diagrams obtained from tensile testing are shown in FIG. 4. Rupture strain $\varepsilon_r$>1600% was observed for the capillary Ag-TPU conductors with Ag loadings up to 15 vol %. Notably, rupture strain was independent of Ag content, contrary to previous reports showing that increased Ag loading resulted in dramatically reduced stretchability (Guo, S. Z., et al., 3D printed stretchable tactile sensors, Advanced Materials, 2017, 29(27); Larmagnac, A., et al., Stretchable electronics based on Ag-PDMS composites, Scientific reports, 2014, 4: p. 7254).

Figure 5:
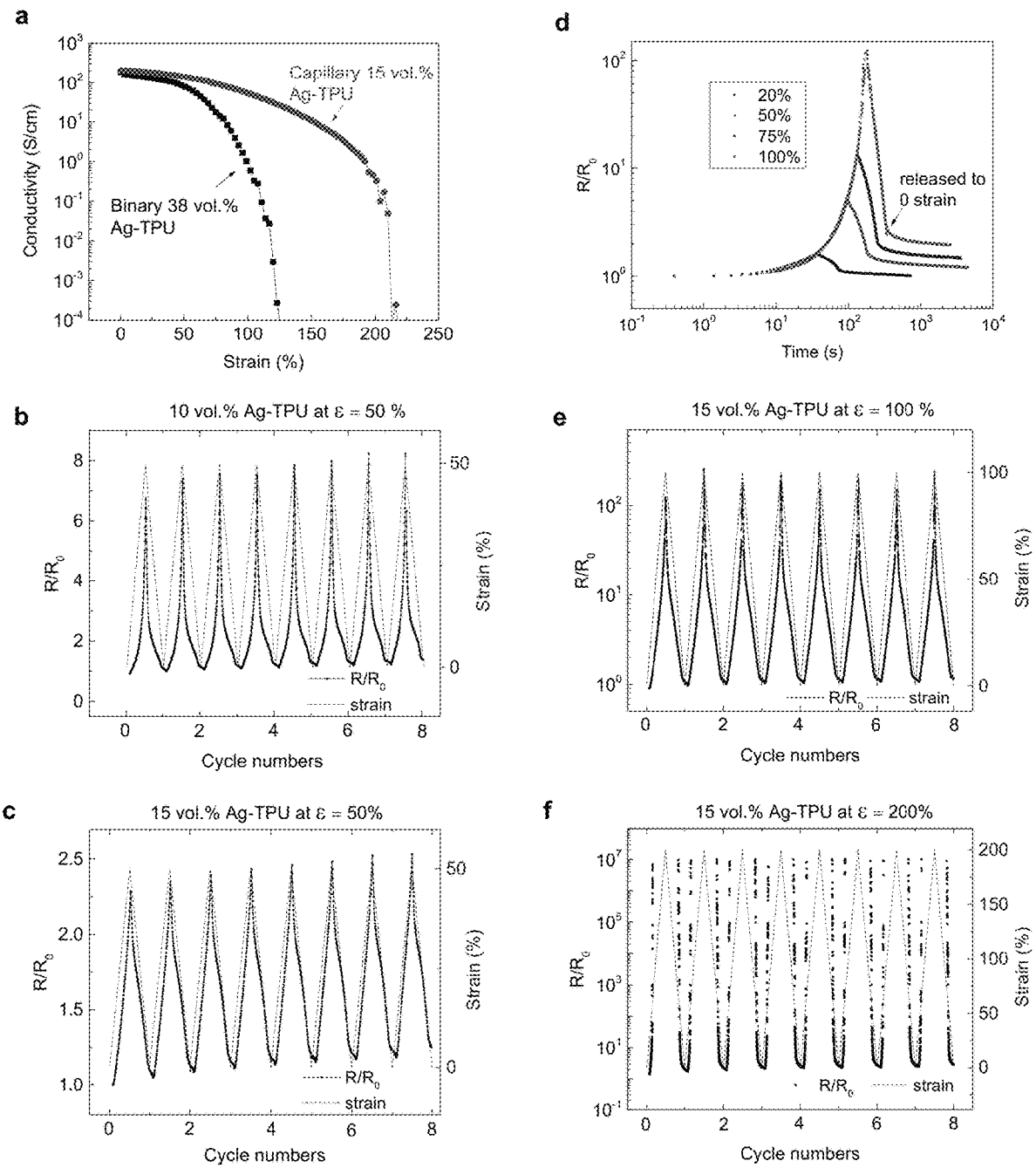

Electro-mechanical performance of a capillary 15 vol. % Ag-TPU conductor and a binary 38 vol. % Ag-TPU conductor is shown in FIG. 5*a*. When strained to 111%, electrical conductivity EC of the binary Ag-TPU system drops to 0.1 S/cm and electrical failure occurs at ~125% strain. The capillary composite, however, exhibits EC=0.1 S/cm at a strain of 205% and electrical failure occurs at ~215%. These results clearly demonstrate the benefits of our capillary suspension concept in terms of electrical conductivity under strain combined with a drastically lower silver consumption.

The sensitivity of 10 vol % Ag and 15 vol. % Ag in TPU against tensile strain was further evaluated during repeated stretching up to 50% strain in 8 cycles following two initial cycles. As shown in FIGS. 5*b* and 5*c*, $R/R_0$ was ~8 for 10 vol % Ag-TPU and ~2.5 for 15 vol. % Ag-TPU. That is, low Ag loading samples are suitable for sensing applications, while high Ag loading samples are suitable for wiring.

To evaluate the resistance recovery, the time evolution of $R/R_0$ was recorded for 15 vol. % Ag-TPU under four different strains during single cycle tests (FIG. 5d). The resistance change followed the same pathway during stretching, irrespective of the applied maximum strain. When the strain was released to zero, resistance was continuously recorded during and after the strain cycle until it reached a stable state (within 5% variation). Resistance increased with stretching and recovered with strain release without retardation. For a small 20% strain, resistance recovered completely. Larger strains led to a resistance residue up to $R/R_0 \sim 2$ after 100% strain. Remarkably, the capillary Ag-TPU conductor according to the present invention exhibited almost complete resistance reversibility, even when it underwent a high tensile strain of 100% and resistance change $R/R_0$ reached 200. To further investigate the reversibility, samples of 15 vol. % Ag-TPU were subjected to 100% and 200% strain. $R/R_0$ measured after two initial cycles at cyclic strains of 100% and 200% are shown in FIGS. 5e and 5f. The sample exposed to 100% strain is at the transition between conductive and non-conductive, as indicated by the more than two orders of magnitude change in $R/R_0$ and variations of peak resistance from one cycle to another. At 200% strain, $R/R_0$ increased by seven orders of magnitude, and the sample was clearly non-conducive at peak strain. $R/R_0$ was always in phase with the applied strain. From one cycle to another the sample switched between conductive and non-conductive states when stretched and released without delay. To the best of the inventors' knowledge, such unique reversibility has not been reported before.

3D Printed Sensors and Wirings from Capillary Inks

Figure 6:
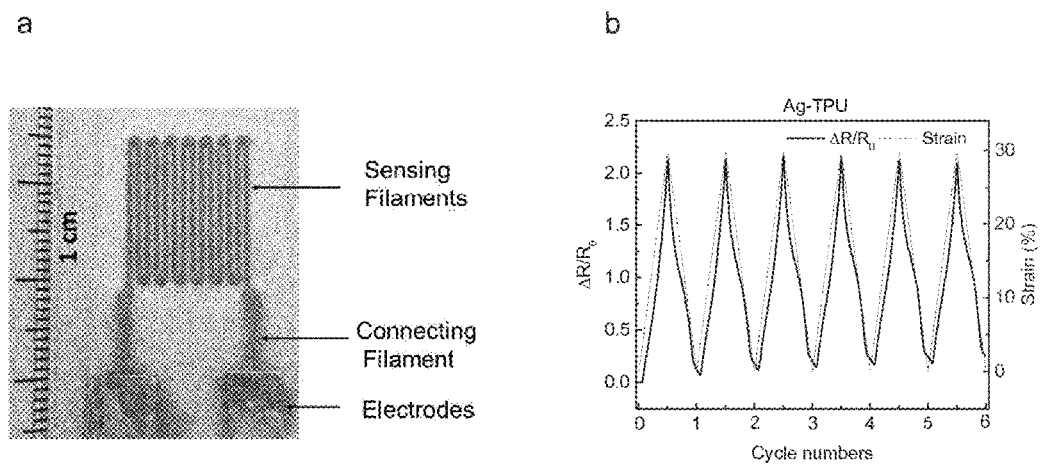
FIG. 6 shows applications of capillary elastic conductors with low Ag loading as strain sensors. a, a serpentine stretchable sensor prototyped using a 3D printer equipped with 250 μm tapered nozzle. b, Strain sensor performance of 10 vol. % Ag-TPU for 6 triangular strain cycles at a maximum strain of 30%. Sensing performance was recorded by the relative resistance change $\Delta R/R_0$.

As a proof of concept for capillary suspension-based elastic conductors, strain sensors were fabricated from inks of low Ag loading and conductive wiring was fabricated from inks of high Ag content by direct ink writing. FIG. 6a shows the serpentine strain sensor printed from capillary Ag-TPU ink with 10 vol. % Ag. Copper foils were used as electrodes. To avoid delamination, the substrates used for printing comprised the same soft polymer as that in the ink. FIG. 6b shows the performance of the sensors. The relative resistance change $\Delta R/R_0$ is shown for 6 cycles of triangle strain after two initial cycles. The sensor exhibits repeatable and in-phase responses to the applied strain. The sensitivity of the sensor was characterized by the gauge factor $GF = (\Delta R/R_0)/\varepsilon$. The sensors obtained according to the present invention show a GF of 7.2 for 10 vol. % Ag-TPU at a strain of 30%.

These GF values are in the same range as those in the previously reported data (Valentine, A. D., et al., *Hybrid 3D printing of soft electronics*, Advanced Materials, 2017, 29(40); Kim, I., et al., *A photonic sintering derived Ag flake/nanoparticle-based highly sensitive stretchable strain sensor for human motion monitoring*, Nanoscale, 2018, 10(17): p. 7890-7897), achieved here, however, at much lower silver consumption.

Figure 7:
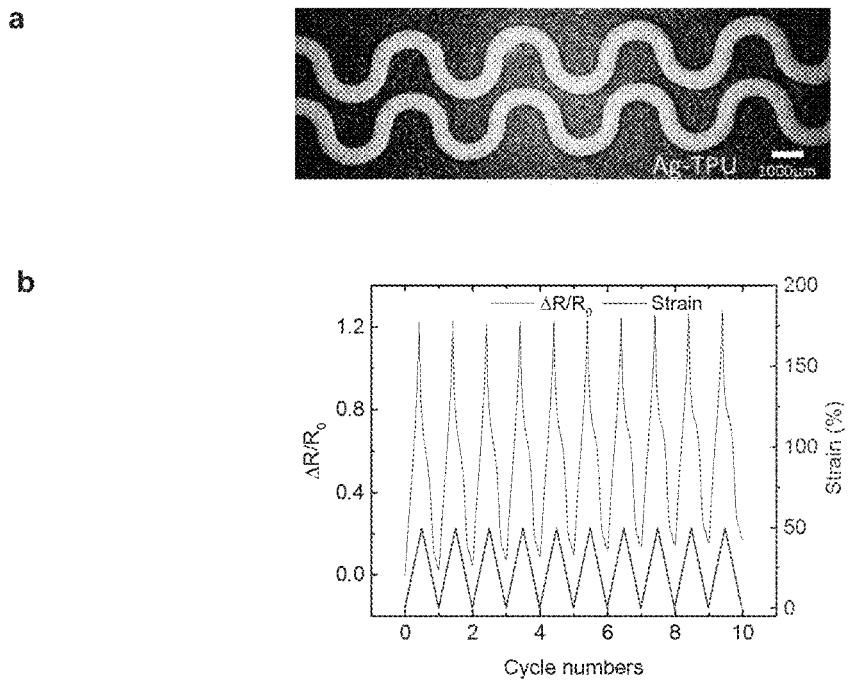
FIG. 7 shows applications of capillary Ag-TPU conductors (silver content 15 vol. %) as conductive wirings. a, microscope images of printed tortuous wires obtained using tapered nozzle in diameter of 250 μm. b, Relative resistance change $\Delta R/R_0$ of wirings for 10 triangular strain cycles at a maximum strain of 50%.

Tortuous, wave-shaped wires of TUP-based capillary ink including 15 vol. % Ag were printed onto the same soft polymer substrate by direct ink writing. The amplitude and wavelength were 1 mm and 2 mm, respectively. The wiring was tested under a triangle strain of 50% for 10 cycles. The microscopy image of patterned wirings before stretching is shown in FIG. 7a. FIG. 7b shows the relative resistance change $\Delta R/R_0$ over 10 cycles after 2 initial cycles.

Ag-TPU wirings had low $\Delta R/R_0 \sim 1.2$, again at a lower silver content compared to the state of the art.

To fully demonstrate the wiring capabilities of our conductive elastomers, a printed stretchable circuit made from 15 vol. % Ag-TPU combined with LEDs, resistors and button cell battery is shown in FIG. 8a. FIG. 8b shows photographs of the circuit during its stretch to 100% strain. It is fully functional at $\varepsilon = 50\%$ and fails at $\varepsilon = 100\%$, as indicated by the on/off of LED lights. However, when strain is released to 70%, the circuit functions again immediately. This demonstrates the outstanding reversibility of the capillary Ag-TPU conductor.

The invention claimed is:

1. A highly conductive, printable ink, comprising:
   (i) 1.5 to 21.0 vol % of conductive hydrophobic silver particles, with respect to the total volume of ink, as conductive solid phase,
   (ii) a liquid primary phase comprising, as a polymer base, a thermoplastic polyurethane (TPU) dissolved in an organic polar solvent, wherein the volume content of TPU in the organic polar solvent is in the range of 25% to 50%, wherein the liquid primary phase takes up 76.90 to 98.49 vol % with respect to the total volume of ink,
   (iii) a liquid secondary phase based on an ionic liquid, with a volume content in the range of 0.0015 to 2.1 vol %, with respect to the total volume of the ink, while the volume ratio $\rho$ between said liquid secondary phase and said conductive solid phase falls in the range of 0.001 to 0.1, wherein the liquid secondary phase is immiscible with the liquid primary phase and does not wet the conductive solid phase, so that the three-phase system creates a capillary suspension.

2. The ink according to claim 1, wherein the conductive hydrophobic silver particles have a medium particle size d50 of 0.1 to 50 µm, measured by laser diffraction in accordance with DIN EN 725-5, ISO 13320.

3. The ink according to claim 1, wherein the thermoplastic polyurethane is selected from polyester-based or polyether thermoplastic polyurethane.

4. The ink according to claim 1, wherein the thermoplastic polyurethane is characterized by having an elongational failure strain $\varepsilon_r$ ranging from 50% to 2500%.

5. The ink according to claim 1, wherein the polar solvent of the liquid primary phase is selected from the group consisting of tetrahydrofuran (THF), dimethyl formamide (DMF), dimethyl sulfoxide (DMSO), dimethylacetamide (DMAc) or combinations thereof.

6. The ink according to claim 5, wherein the polar solvent is mixed with a co-solvent selected from acetone, methyl ethyl ketone (MEK), cyclohexanone, toluene or ethyl acetate (ETAc).

7. The ink according to claim 1, wherein the ionic liquid contains a substituted or unsubstituted imidazolium cation, wherein the imidazolium cation of the salt is preferably in the 1- and 3-position or in the 1-, 2- and 3-position with (C1-C6) alkyl groups, and the anion of the ionic liquid is a halide, perchlorate, pseudohalide, sulfate, phosphate, alkyl phosphate and/or a C1-C6 carboxylate ion.

8. The ink according to claim 7, wherein the imidazolium cation is selected from the 1-ethyl-3-methylimidazolium, 1,3-dimethylimidazolium or 1-butyl-3-methylimidazolium cation.

9. The ink according to claim 1, wherein the ionic liquid contains 1-butyl-3-methylimidazolium iodide, 1-butyl-3-methylimidazolium chloride, or 1-butyl-3-methylimidazolium bromide:

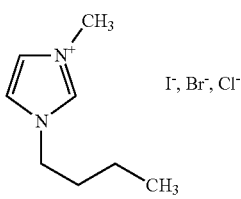

10. A process for producing a highly conductive and printable ink according claim 1, comprising:
mixing of
(i) 1.5 to 21.0 vol % of conductive hydrophobic silver particles, with respect to the total volume of ink, as conductive solid phase,
(ii) a liquid primary phase comprising, as a polymer base, a thermoplastic polyurethane (TPU) dissolved in an organic polar solvent, wherein the volume content of TPU in the organic polar solvent is in the range of 25% to 50%, wherein the liquid primary phase takes up 76.90 to 98.49 vol % with respect to the total volume of ink,
(iii) a liquid secondary phase based on an ionic liquid, with a volume content in the range of 0.0015 to 2.1 vol %, with respect to the total volume of the ink, while the volume ratio ρ between said liquid secondary phase and said conductive solid phase falls in the range of 0.001 to 0.1, wherein the liquid secondary phase is immiscible with the liquid primary phase and does not wet the conductive solid phase, so that the three-phase system creates a capillary suspension.

11. The process according to claim 10, wherein the silver particles are dispersed in the liquid primary phase by mechanical stirring, followed by adding the liquid secondary phase and a subsequent mixing step to break up the liquid secondary phase into droplets.

12. A process for producing highly stretchable soft electronics in the form of an elastic composite by applying the ink according to claim 1 on a soft substrate, preferably by means of dispensing, screen printing, slot die coating, spraying or direct ink writing, and then evaporating the solvents, to yield a stretchable and deformable electrical device.

13. A highly conductive, stretchable conductor obtainable by the process of claim 12, comprising:
(i) 5 to 30 vol %, preferably 8 to 20 vol %, of conductive hydrophobic silver particles, with respect to the resulting solid conductor, as conductive solid phase,
(ii) 67 to 94.99 vol %, preferably 78.80 to 91.99 vol %, of thermoplastic polyurethane (TPU), and
(iii) a liquid (secondary) phase based on an ionic liquid, with a volume fraction of 0.005 to 3.0 vol %, preferably 0.08 to 1.20 vol %, with respect to the resulting solid conductor, while the volume ratio ρ between said liquid secondary phase and said conductive solid phase falls in the range of 0.001 to 0.1.

14. An article formed from the highly conductive and printable ink according to claim 1 sensors, soft robotics, wireless devices, flexible solar cells, or soft electronics.

15. The article of claim 14, wherein the article is selected from a sensor, a soft robotic, a wireless device, a flexible solar cell, or a soft electronic.

* * * * *